(12) United States Patent
Smith et al.

(10) Patent No.: US 8,539,481 B2
(45) Date of Patent: *Sep. 17, 2013

(54) USING VIRTUAL HIERARCHIES TO BUILD ALTERNATIVE NAMESPACES

(75) Inventors: Frederick J. Smith, Redmond, WA (US); Jeff L. Havens, Issaquah, WA (US); Madhusudhan Talluri, Bellevue, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1605 days.

This patent is subject to a terminal disclaimer.

(21) Appl. No.: 11/301,093

(22) Filed: Dec. 12, 2005

(65) Prior Publication Data

US 2007/0136723 A1 Jun. 14, 2007

(51) Int. Cl.
*G06F 9/455* (2006.01)
(52) U.S. Cl.
USPC ..................... 718/1; 726/16; 726/17; 726/21
(58) Field of Classification Search
None
See application file for complete search history.

(56) References Cited

U.S. PATENT DOCUMENTS

| | | | |
|---|---|---|---|
| 5,214,778 A | 5/1993 | Glider et al. | |
| 5,682,530 A | 10/1997 | Shimamura | |
| 5,923,884 A | 7/1999 | Peyret et al. | |
| 6,374,286 B1 | 4/2002 | Gee et al. | |
| 6,408,298 B1 * | 6/2002 | Van et al. | 1/1 |
| 6,529,966 B1 | 3/2003 | Willman et al. | |
| 6,532,505 B1 | 3/2003 | Stracovsky et al. | |
| 6,961,941 B1 | 11/2005 | Nelson et al. | |
| 7,103,661 B2 | 9/2006 | Klein | |
| 7,185,192 B1 | 2/2007 | Kahn | |
| 7,188,339 B2 | 3/2007 | Qureshi | |
| 7,389,512 B2 | 6/2008 | Tucker | |
| 7,447,896 B2 | 11/2008 | Smith et al. | |
| 7,461,080 B1 * | 12/2008 | Tucker | 1/1 |
| 2001/0004753 A1 | 6/2001 | Dell et al. | |
| 2002/0095479 A1 | 7/2002 | Schmidt | |
| 2002/0095500 A1 | 7/2002 | Schmidt | |
| 2003/0110188 A1 * | 6/2003 | Howard et al. | 707/200 |
| 2004/0030731 A1 * | 2/2004 | Iftode et al. | 707/205 |

(Continued)

FOREIGN PATENT DOCUMENTS

| | | |
|---|---|---|
| EP | 1 475 703 | 11/2004 |
| WO | WO 2004/027613 | 4/2004 |

(Continued)

OTHER PUBLICATIONS

Wright, C., Kernel Korner—Unionfs: bringing filesystems together, *Linux Journal*, 2004, http://www.linuxjournal.com/article/7714, downloaded from the Internet on Apr. 27, 2006, 18 pages.

(Continued)

*Primary Examiner* — H S Sough
*Assistant Examiner* — Umut Onat
(74) *Attorney, Agent, or Firm* — Woodcock Washburn LLP

(57) ABSTRACT

A containment mechanism provides for the grouping and isolation of multiple processes running on a single computer using a single instance of the operating system. A system is divided into one or more side-by-side and/or nested isolated environments enabling the partitioning and controlled sharing of resources by creating different views of hierarchical name spaces via virtual hierarchies.

20 Claims, 10 Drawing Sheets

(56) References Cited

U.S. PATENT DOCUMENTS

| | | |
|---|---|---|
| 2004/0226015 A1 | 11/2004 | Leonard et al. |
| 2005/0021788 A1* | 1/2005 | Tucker et al. .............. 709/229 |
| 2005/0091214 A1 | 4/2005 | Probert et al. |
| 2005/0091658 A1 | 4/2005 | Kavalam et al. |
| 2005/0125537 A1 | 6/2005 | Martins et al. |
| 2006/0075123 A1 | 4/2006 | Burr et al. |
| 2006/0090171 A1 | 4/2006 | Laborczfalvi et al. |
| 2006/0230042 A1 | 10/2006 | Butler et al. |
| 2006/0282658 A1 | 12/2006 | Tang |
| 2007/0134069 A1 | 6/2007 | Smith et al. |
| 2007/0134070 A1 | 6/2007 | Smith et al. |
| 2007/0136356 A1 | 6/2007 | Smith et al. |

FOREIGN PATENT DOCUMENTS

| | | |
|---|---|---|
| WO | WO 2004/068722 | 8/2004 |
| WO | WO 2007/070535 | 6/2007 |
| WO | WO 2007/070555 | 6/2007 |

OTHER PUBLICATIONS

Kamp et al., "Jails: Confining the omnipotent root," The FreeBSD Project, downloaded May 15, 2009, pp. 1-15.

"System Administration Guide: Solaris Containers Resource Management and Solaris Zones," Sun Microsystem, Inc., 2009, pp. 1-506.

\* cited by examiner

300

USING VIRTUAL HIERARCHIES TO BUILD ALTERNATIVE NAMESPACES

CROSS-REFERENCE TO RELATED CASES

This application is related in subject matter to U.S. patent application Ser. No. 11/301,066, entitled "OS Mini Boot for Running Multiple Environments" filed Dec. 12, 2005, U.S. patent application Ser. No. 11/301,071, entitled "Use of Rules Engine to Build Namespaces" filed Dec. 12, 2005, U.S. patent application Ser. No. 11/301,072, entitled "Mechanism for Drivers to Create Alternate Namespaces" filed Dec. 12, 2005, and U.S. patent application Ser. No. 11/301,065 entitled "Building Alternative Views Of Name Spaces" filed Dec. 12, 2005.

BACKGROUND

When a single computer is used to run multiple workloads, a balance should be struck between isolation of applications and the cost of using and administering the application-isolating system. Applications should ideally be isolated from each other so that the workload of one application does not interfere with the operation or use of resources of another application. On the other hand, the system should be flexible and manageable to reduce the cost of using and administering the system. Ideally, the system should be able to selectively share resources while maintaining application isolation. Typically, however, all processes running under the same user account have the same view of system resources. The lack of isolation of the applications running on a particular computer contributes to application fragility, application incompatibility, security problems and the inability to run conflicting applications on the same machine.

A number of different solutions have been proposed which address one or more aspects of the problems discussed above. One way to isolate applications running on the same machine is to run the applications on different "virtual machines". A virtual machine (VM) enables multiple instances of an operating system (OS) to run concurrently on a single machine. A VM is a logical instance of a physical machine, that is, a virtual machine provides to the operating system software an abstraction of a machine at the level of the hardware: that is, at the level of the central processing unit (CPU), controller, memory, and so on. Each logical instance has its own operating system instance with its own security context and its own isolated hardware resources so that each operating system instance appears to the user or observer to be an independent machine. VMs are typically implemented to maximize hardware utilization. A VM provides isolation at the level of the machine but within the virtual machine, no provisions for isolating applications running on the same VM are provided for by known VM implementations.

Other known proposed solutions to aspects of the problems described above include Sun Microsystem's Solaris Zones, jails for UNIX BSD and Linux, the VServers project for Linux, SWSoft's Virtuozzo, web hosting solutions from Ensim and Sphera, and software available from PolicyMaker, and Softricity.

Another approach that addresses aspects of application isolation is hardware partitioning. A multi-processor machine is divided into sub-machines, each sub-machine booting an independent copy of the OS. Hardware partitioning typically only provides constrained resource allocation mechanisms (e.g., per-CPU allocation), does not enable input/output (IO) sharing and is typically limited to high-end servers.

Hence, in many systems, limited points of containment in the system exist at the operating system process level and at the machine boundary of the operating system itself, but in between these levels, security controls such as Access Control Lists (ACLs) and privileges associated with the identity of the user running the application are used to control process access to resources. There are a number of drawbacks associated with this model. Because access to system resources is associated with the identity of the user running the application rather than with the application itself, the application may have access to more resources than the application needs. Because multiple applications can modify the same files, incompatibility between applications can result. There are a number of other well-known problems as well.

There is no known easy and robust solution using known mechanisms that enables applications to be isolated while still allowing controlled sharing of resources. It would be helpful if there were a mechanism that allowed an application, process, group of applications or group of processes running on a single machine to be isolated using a single operating system instance while enabling controlled sharing of resources.

SUMMARY

An intra-operating system isolation/containment mechanism called herein a silo provides for the grouping and isolation of processes running on a single computer using a single instance of the operating system. A single instance of the operating system divides the system into multiple side-by-side and/or nested isolated environments (silos) enabling the partitioning and controlled sharing of resources by providing a view of a system name space to processes executing within the silos. That is, a single OS image serving the computer employs the mechanism of name space containment to constrain which process, group of processes, application or group of applications can use which resource(s). Restricting access to resources is therefore directly associated with or based on the silo the process or application is placed in because if a process or application is unable to resolve a name used to access a resource, it will be unable to use the resource. More particularly, controlled sharing of resources is implemented via hierarchical name space containment of hierarchical name spaces such as the file system. New points of containment are provided at the process level, group of processes level, application level, or group of applications level. A silo provides an abstraction at the level of a high level operating system—(e.g., at the level of files, directories, objects and semaphores) to the applications and processes within the silo by enabling the applications and processes to run within the silo's view of the system or parent hierarchy.

A silo-specific view of the system hierarchy (or view of the parent hierarchy in the case of a nested silo) may be created by creating and exposing a virtual hierarchy or tree, the nodes of which may be linked back to a node or name in a physical hierarchy associated with the external system environment in which the silo resides (or to a node or name in a parent silo). A virtual hierarchy is volatile. It is not persisted to permanent storage (e.g., is not written to disk or to other stable storage media) but resides only in memory or other volatile media and may be created dynamically as the silo is initiated. When the silo exits, the virtual hierarchy may be discarded. The physical hierarchy in contrast, is permanent (persisted to stable storage) and is independent of the existence or non-existence of the silo. A silo may be implemented by having the silo provide the root for the processes running in the silo. For example, the silo may provide the root of a virtual directory to be used by a process running in the silo. The provided root may represent the root of the file system directory for the process in the silo. A process within the silo cannot see or express any names above the virtual root. One or more hierarchies may be associated with a silo.

A virtual hierarchy may be created by grafting branches from the system hierarchy onto nodes directly or indirectly attached to the virtual root associated with the silo. For the virtual file system, the grafting operation makes either a file or a directory appear at one or more places within the process's virtual file system directory. The file system implementation effectively builds a new file system view over the system's physical file system name space (which is persisted to permanent storage and does exist after the silo exits) or over the parent's file system name space. This concept may also be applied to other hierarchical name spaces such as the registry and the object manager name spaces.

DETAILED DESCRIPTION

Overview

Figure 1:
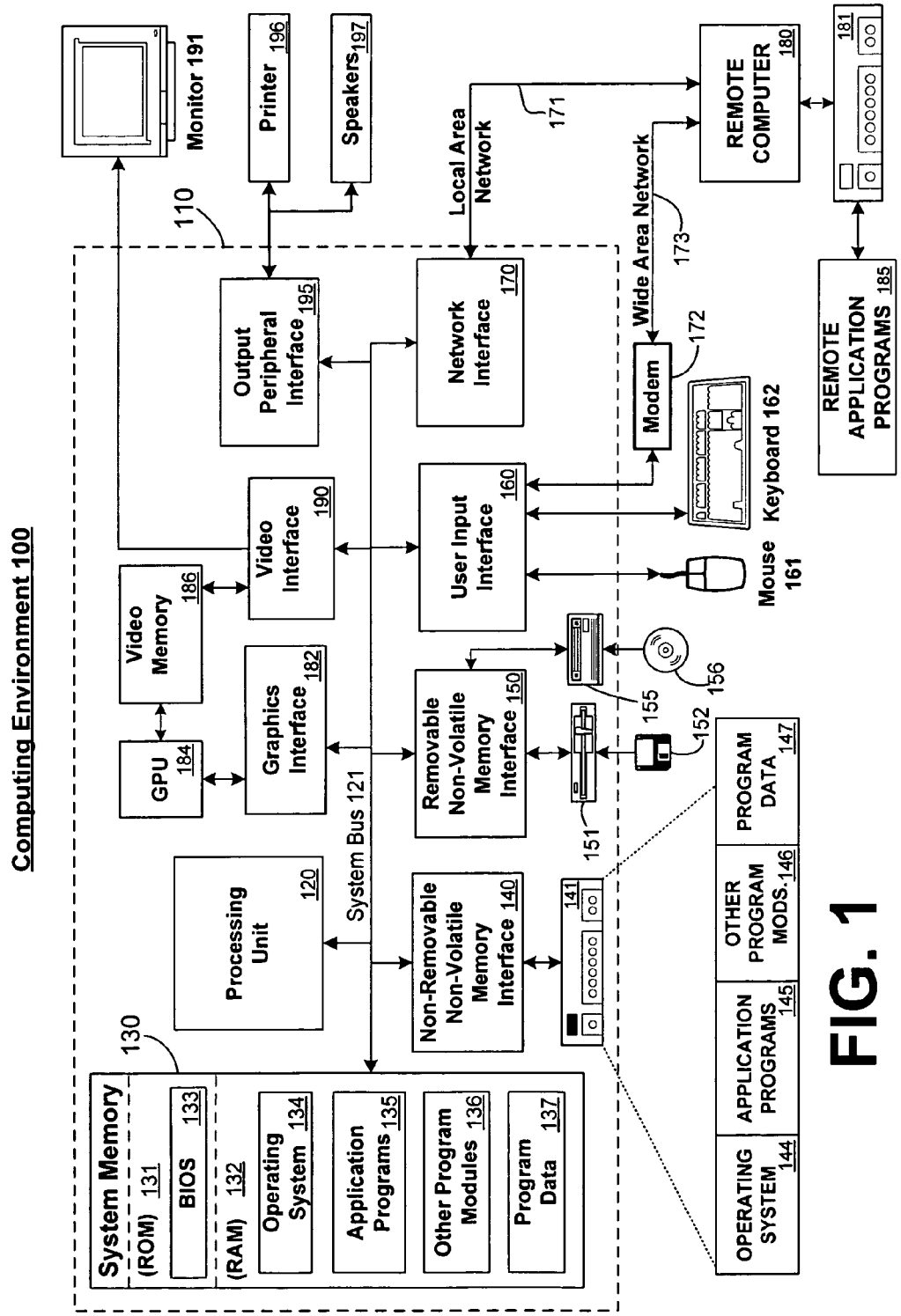
FIG. 1 is a block diagram illustrating an exemplary computing environment in which aspects of the invention may be implemented.

A file system is a method for storing and organizing computer files and the data the files contain, on storage (e.g., on disk). Most file systems use an underlying non-volatile data storage device on which files are persisted. A typical storage device provides access to an array of fixed-size blocks, sometimes called sectors, which are generally 512 bytes each. The file system software is responsible for organizing these sectors into files and directories. The file system also keeps track of which sectors belong to which file and which sectors are not being used. Traditional file systems offer facilities to create, move and delete both files and directories.

File systems typically have directories which associate file names with files, usually by connecting the file name to an index into a file allocation table of some sort, such as the FAT in an MS-DOS file system, or an inode in a UNIX-like file system. Directory structures may be flat, or may allow hierarchies. In hierarchical directories, each directory may include one or more sub-directories. In some file systems, file names are structured, with special syntax for filename extensions and version numbers. In others, file names are simple strings, and per-file metadata is stored elsewhere.

A disk file system is a file system designed for the storage of files on a data storage device, most commonly a disk drive. The disk drive may be directly or indirectly connected to the computer. Examples of disk file systems include FAT, NTFS, HFS, ext2, ISO 9660, ODS-5, and UDF. In contrast, database file systems are not hierarchical. Instead of hierarchical structured management, files are identified by their characteristics, like type of file, topic, author, or similar metadata. Examples include Gnome VFS, BFS, and WinFS. Transactional file systems are those that log events or transactions to files. Each operation performed may involve changes to a number of different files and disk structures. In many cases, these changes are related, so they should be executed at the same time. An example might be a bank sending another bank some money electronically. The bank's computer will send the transfer instruction to the other bank and it will also update its records to indicate the transfer has occurred. If the bank's computer crashes before its records have been updated, upon reset, there will be no record of the transfer but the bank will be missing some money. A special purpose file system is a file system that is not a disk file system or network file system. This includes systems where the files are arranged dynamically by software, intended for communication between computer processes or temporary file space, for instance.

Various file systems use one or more of three kinds of links to point to data in files: hard links, symbolic links and aliases. A hard link is a reference or pointer to the physical data on a volume. In most file systems, all named files are hard links. The name associated with the file is a label that refers the operating system to the actual data. More than one name can be associated with the same data but the data must exist in the same file system. A symbolic link is a type of link used in Unix, for example, which refers to another file by its pathname. In contrast with hard links, there are no restrictions on where a symbolic link can point, it can refer to a file on another file system, to itself or to a file which does not even exist (detected as a problem only when the link is accessed). An alias is designed to maintain a link to its original file even if the original file is moved or renamed. All of these links are, however, typically associated with non-volatile directories.

Unix and Unix-like operating systems assign a device name to each device, but the files on the device are not accessed by the device name. Instead files on the device are accessed by a virtual file system, which makes all the files on all the devices appear to exist under one hierarchy. This means that in Unix there is only one root directory shared by all the partitions on the device. Every file existing on the system is located somewhere under that single root directory. The UNIX chroot command enables the root directory to become something other than its default for the lifetime of a process, however the root directory is stored on non-volatile storage media, so that if the process crashes, the directory stored on disk must be rebuilt.

Unlike many other operating systems, Microsoft WINDOWS uses a drive letter abstraction at the user level to distinguish one partition from another. For example, the path C:\WINDOWS\ represents a directory WINDOWS on the partition represented by the letter C. Each drive letter or partition is associated with a directory tree data structure. Each directory tree data structure has a root which represents the first or top-most directory in a hierarchy. It is the starting point from which all the directories in the hierarchy originate. In Unix all file system entries, including mounted partitions are leaves of this root. However under DOS and WINDOWS, each partition has a separate root directory (labeled C:\ for a particular partition C) and there is no common root directory above that. Each device may be partitioned into multiple partitions, so that multiple root directories may be associated with a single device. (For example, a user's physical hard disk may be partitioned into multiple logical "disks", each of which have their own "drive letter" and root directory.)

Secure access to file system operations can be based on access control lists (ALCs) or on capabilities. Most commercial file systems, including some Microsoft WINDOWS operating systems, use access control lists to control access to resources. Because of the widespread use of ACL-based permission controls, multiple applications are often allowed to share resources (including shared access of hierarchical name spaces). Access to the resources is based on privileges associated with the identity of the person running the application or process rather than being based on the needs and characteristics of the application itself. This approach can be problematic. For example, a user may have broad access privileges (e.g., administrator status) because some of the programs he runs need that level of access. For example, because program_1 run by user_1 needs access to files one to ten, user_1's access privileges must permit him to access files one to ten. Suppose program_2 only needs access to files one and two. When user_1 runs program_2, program_2 will nevertheless have access to files one to ten, because user_1's privileges allow access to files one to ten. Thus, because file system operations are based on ACL-based permission controls, in general, the file system name space can be and generally is more or less global to all the processes launched by user_1 running on the machine. ACL-based permission controls lead to a number of problems including: a program could waste processing time handling things it should not consider, the presence of a new file that the program is not expecting might cause the program to operate incorrectly, different programs may write or modify the same file, causing interference and so on. This problem is exacerbated because not all programs have the same level of trustworthiness. Program_2 may not be as trustworthy as program_1 but since the user's privileges allow him to access files one to ten, program_2 has access to files one to ten and may maliciously modify them. In addition, there may be occasions when it is desirable to provide different programs different files even though the programs use the same name for the file. Finally, different programs may use the same name but mean different files. Hence, there is a need for better control of shared resources than that which can easily be obtained using ACLs and privileges.

To address the need for a more powerful access control mechanism than that provided for by ACLs, the silo containment mechanism is introduced that enables the creation of a new isolated environment in which a process, program, set of programs or application can run. A new name space is created and associated with the isolated environment. The new name space provides a view of a global name space for the process, program, set of programs or application running in the silo. The new name space is created by creating a virtual hierarchy and joining pieces of an existing physical, non-volatile (e.g., on disk) file system to the leaf nodes of the virtual hierarchy, to create a silo-specific virtual hierarchy. The virtual hierarchy is stored in volatile storage (e.g., memory) and has no effect on the system hierarchy which is stored in non-volatile storage. As the virtual hierarchy does not affect the global name space and is not persisted to non-volatile storage, if the system crashes, the global name space does not need to be repaired or restored, as would be required if the global or system name space on non-volatile storage were modified. This concept may be applied to hierarchies such as the file system and other hierarchical name spaces.

The invention contemplates the presence of a number of silos that are fairly dynamic—that is, the silos may come and go and may change fairly rapidly. When the silo is created, one or more virtual hierarchies for the silo are created in memory. When the silo exits, the virtual hierarchy or hierarchies for the silo are discarded.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Use Of Virtual Hierarchies to Build Alternative Hierarchical Name Spaces

Figure 2:
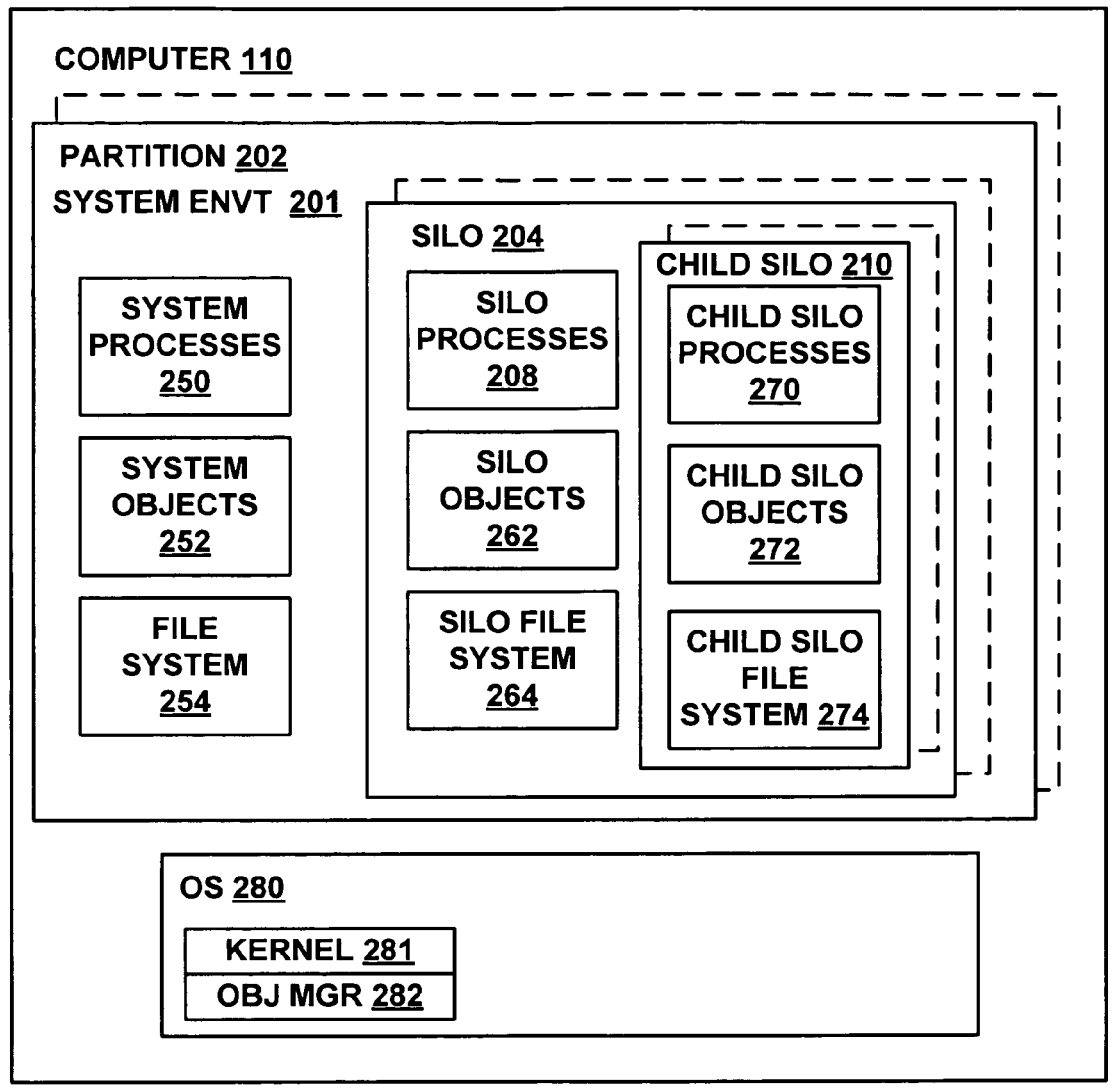
FIG. 2 is a block diagram of a system for creating and using virtual hierarchies to build alternative hierarchical name spaces in accordance with some embodiments of the invention.

FIG. 2 is a block diagram illustrating a system for creating and using virtual hierarchies to build alternative hierarchical name spaces to restrict access to resources based on the process rather than permissions associated with the user running the process. System 200 may reside on a computer such as the one described above with respect to FIG. 1. System 200 may include one or more partitions such as partition 202, etc. A drive letter abstraction as described above may be provided at the user level to distinguish one partition from another. Each drive letter or partition may be associated with a hierarchical data structure. Each hierarchy has a root which represents the first or top-most node in the hierarchy. It is the starting point from which all the nodes in the hierarchy originate. As each device may be partitioned into multiple partitions, multiple roots may be associated with a single device. (For example, a user's physical hard disk may be partitioned into multiple logical "disks", each of which have their own "drive letter" and their own root.) A single instance of the operating system images serves all the partitions of the computer in some embodiments of the invention.

Within each partition, system 200 may include a system environment 201 and a number of isolated environments. In some embodiments of the invention, the isolated environments are silos. The system environment 201 may include or be associated with a number of name spaces including but not limited to one or more of: a system processes name space 250, a system objects name space 252 and a file system name space 254. System 200 may also include an operating system 280. The operating system 280 may include one or more operating system components including but not limited to an operating system kernel 281 and an object manager 282. In some embodiments of the invention, the object manager resides within the kernel. System 200 may also include other components not here shown but well known in the art.

System 200 may include one or more side-by-side silos 204, etc. in each partition or associated with each drive letter. Each silo in some embodiments is associated with its own silo process name space, silo object name space and silo file system name space but shares a single operating system instance with all the processes in the system. For example, in FIG. 2, silo 204 is associated with silo processes name space 208, silo objects name space 262 and silo file system name space 264. Silo 204, etc. does not however, have its own operating system instance. That is, for example, silo 204 is served by the same operating system instance (operating system 280) that serves the system environment 201 and any other silos that may exist. Silo 204, etc. may include one or more child silos 210, etc. Silo 210 itself may include one or more child silos and so on to any degree of nesting. Child silo 210 in FIG. 2 is associated with child silo processes name space 270, child silo objects name space 272 and child silo file system name space 274 but is served by the same operating system instance that serve all the other environments. A child silo may be created by a process running in its parent silo. For example, in FIG. 2, a process in silo processes name space 208 may have created child silo 210 by creating a view into the silo 204 name space, as described more fully below. A process may not escape from its silo. For example a process in silo processes name space 208 may not escape from silo 204. Similarly, a child process of child silo processes name space 270 may not escape from child silo 210. Furthermore, the smallest entity capable of being siloed (placed in its own silo) is a process. A sub-process cannot be siloed.

Figure 3:
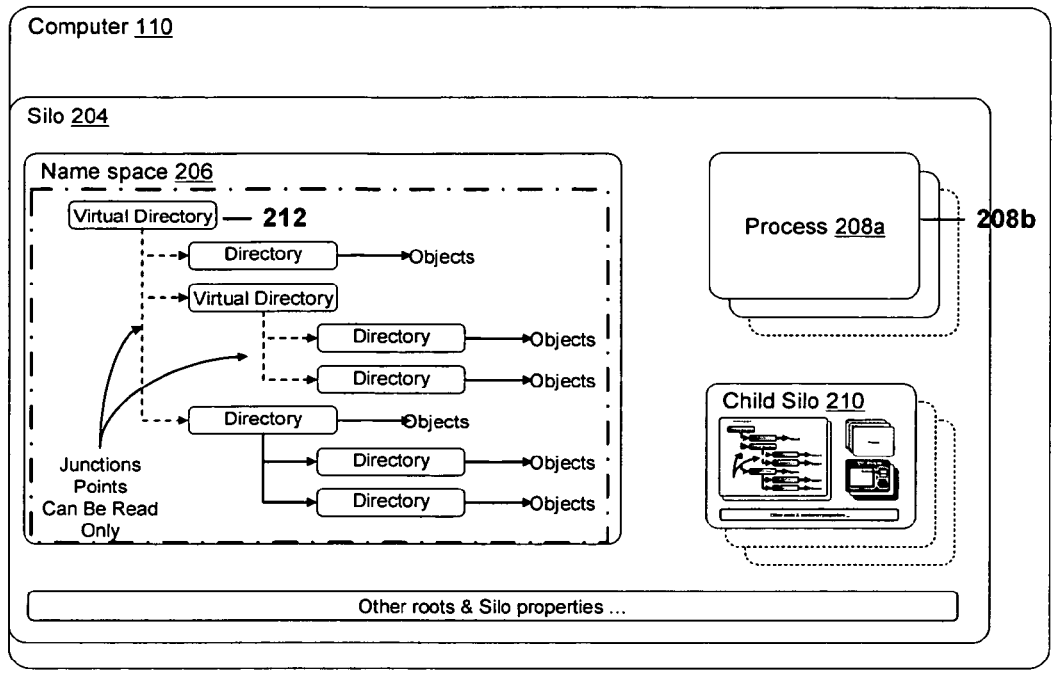
FIG. 3 is another block diagram of a system for creating and using virtual hierarchies to build alternative hierarchical name spaces in accordance with some embodiments of the invention.

FIG. 3 is a more detailed illustration of a portion 300 of system 200. In FIG. 3, name space 206 of silo 204 on computer 110 may represent the file system name space, the process identifier name space or others. Each name space may have its own virtual root. For example, each silo (parent silo 204, child silo 210) may have its own virtual root for the file system (e.g., the virtual root directory 212 illustrated within name space 206 for silo 204 may be a file system virtual root directory) for each physical volume exposed to the silo. Similarly, each silo (parent silo 204, child silo 210) may have its own virtual root for the process identifier name space (e.g., the virtual root directory 212 illustrated within name space 206 for silo 204 may be a process identifier root) for each physical volume exposed to the silo, and so on. The virtual root for the silo may or may not have the same set of nodes or entries as the corresponding physical global name space of the volume, but typically it does not. The virtual root hierarchy may include junctions or links back to the physical name space, which is discussed in more detail with respect to FIGS. 4a-c. The processes in the silo therefore can be given an alternate view of the global name space on the physical volume.

Thus the global name space for resources may be overridden by a silo-specific version of the name space (the virtual hierarchy) that restricts the access of processes within the silo to the resources to those appearing within the virtual hierarchy. Processes may be assigned to the silo based on characteristics associated with the process so that resources can be restricted for processes in the silo based on the process instead of based on the user running the process. For example, each silo may override portions of the global file system name space. If the silo is a child silo, portions of the parent silo name spaces can be overridden by the child silo name space. For example, when a process such as process 208a, 208b, etc. running within a silo (e.g., silo 204) attempts to access a particular part of the file system, the access may be redirected to a silo-specific version of the file system.

Figure 4A:
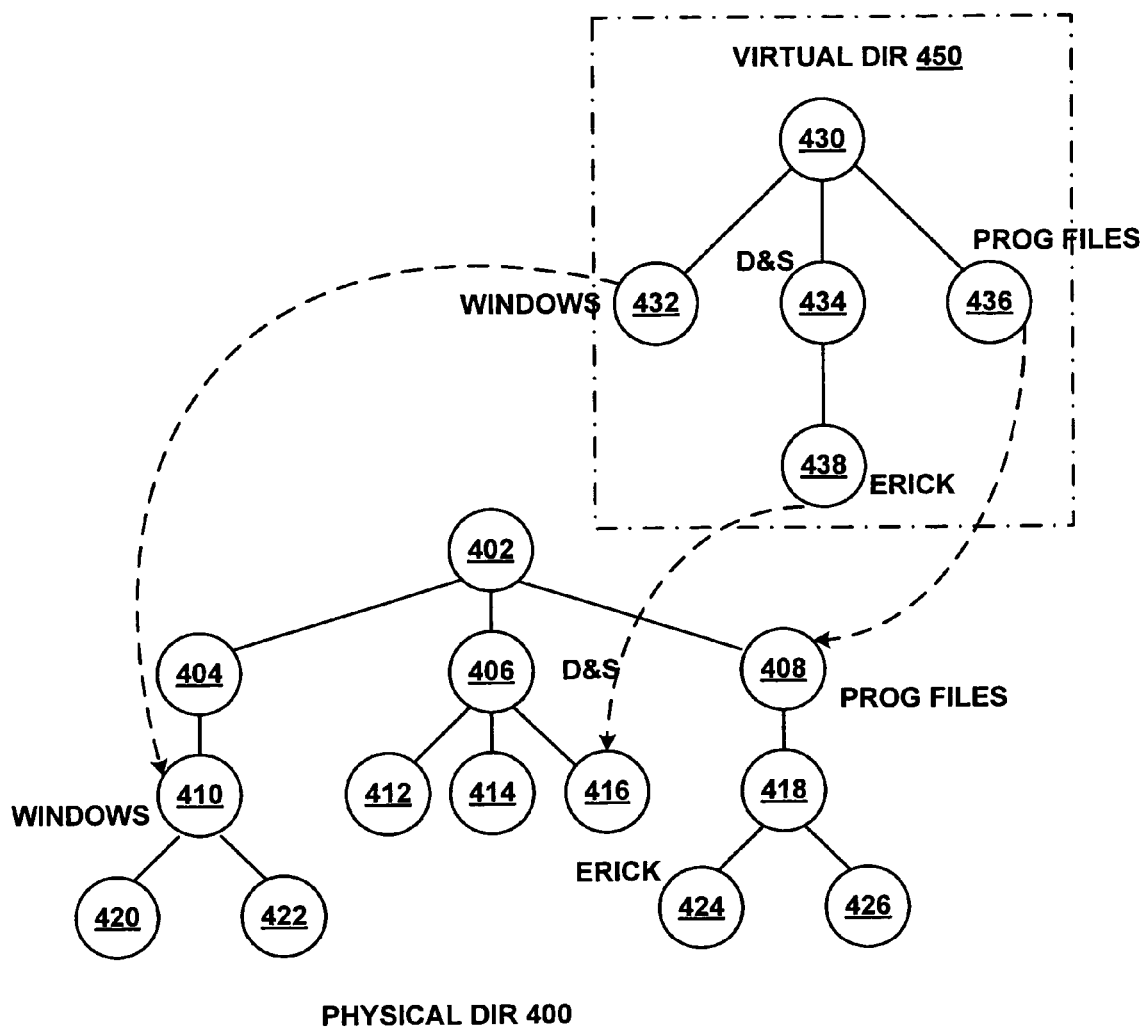
FIGS. 4a-d are block diagrams illustration the creation of a virtual hierarchy in accordance with some embodiments of the invention.
Figure 4B:
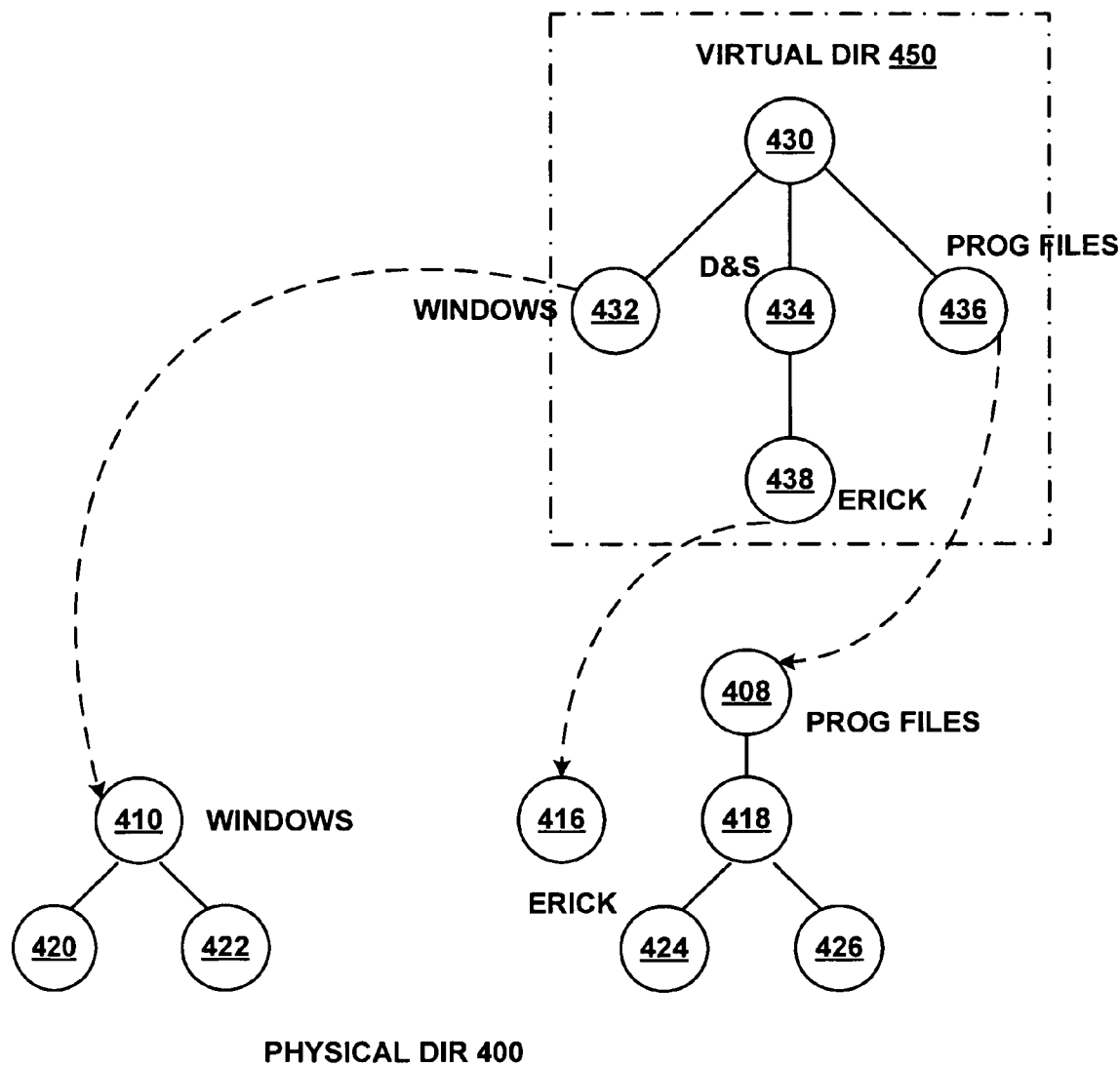
Figure 4C:
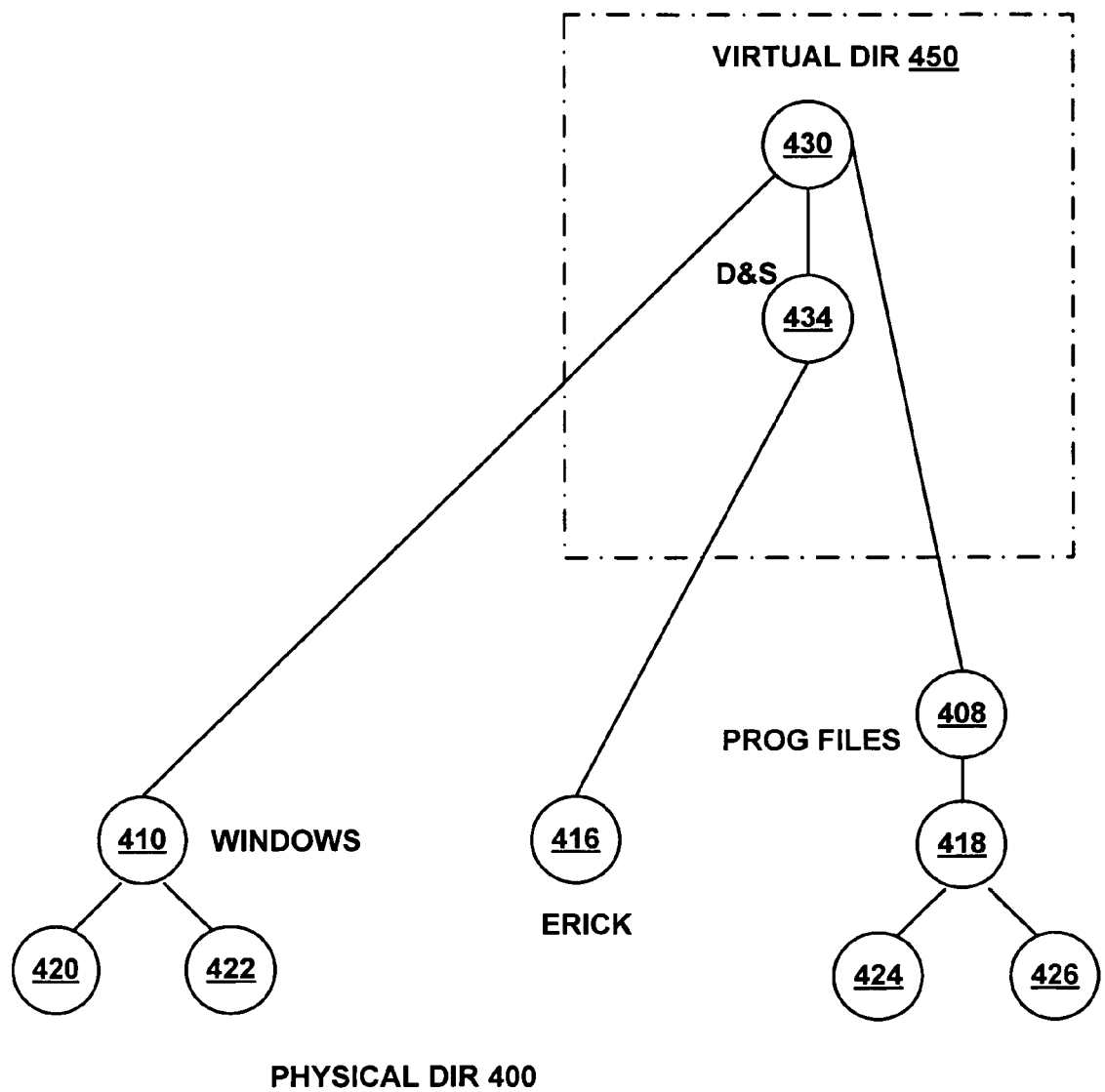
Figure 4D:
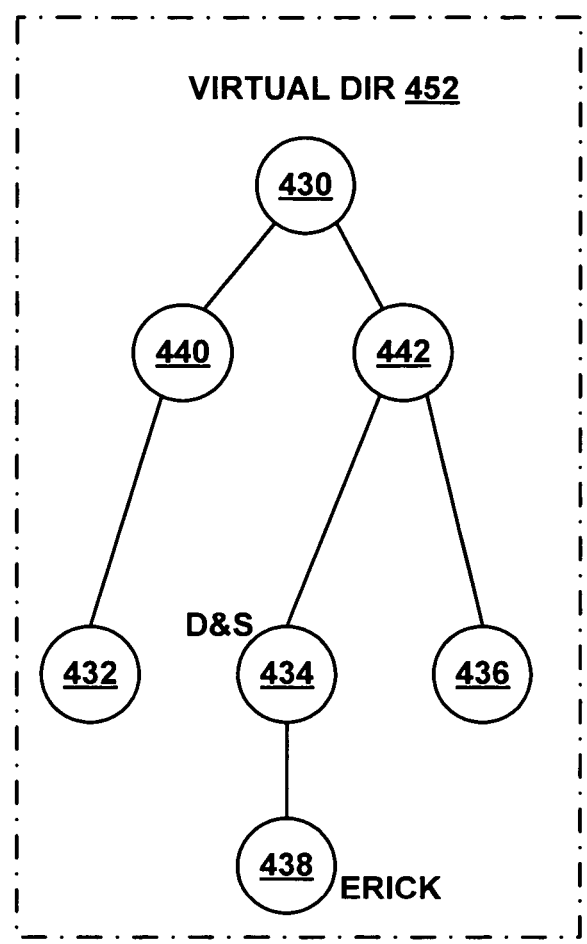
Figure 4E:
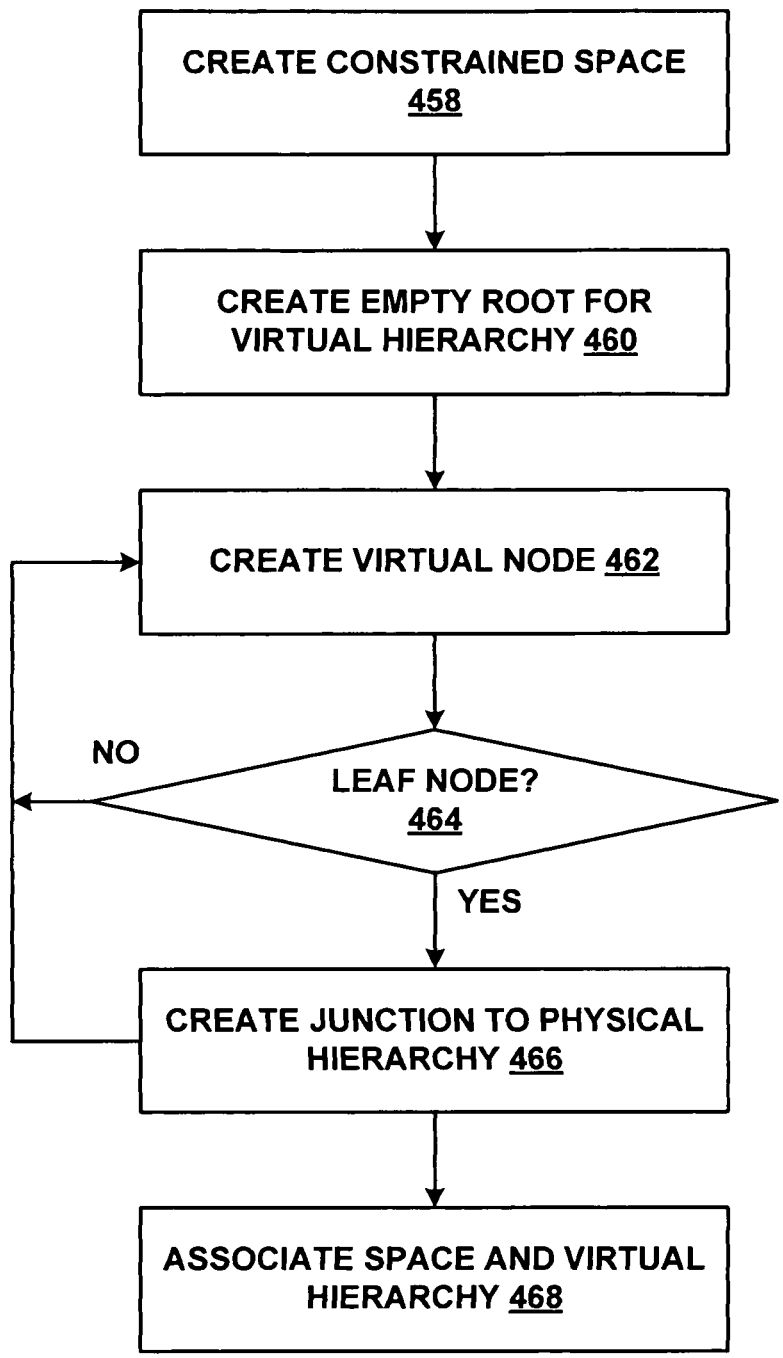
FIG. 4e is a flow diagram of a process for creating an isolated environment in accordance with some embodiments of the invention.

FIG. 4e represents the creation of an isolated environment (e.g., a silo). FIGS. 4a-4d illustrate the creation of a virtual hierarchy for the isolated environment. Referring now to FIG. 4e, at 458, an isolated environment (silo) is created. At 460 a virtual root for a virtual hierarchy is created. At 462 a virtual node within the virtual hierarchy is created. At 464, if the virtual node is a leaf node, a junction to the physical hierarchy may be created (466). This process may be repeated for each node in the virtual hierarchy. The virtual hierarchy is associated with the isolated environment (468). The virtual hierarchy may be associated with the isolated environment by, for example, setting the virtual hierarchy to be the default file system for the silo.

To illustrate the creation of a virtual hierarchy for a silo, the following example is directed to the creation of a virtual file system directory for the silo, but it will be understood that the process also applies to the creation of other hierarchical name spaces. In FIG. 4a the tree structure outside of the dotted box illustrates an exemplary physical file system directory 400, as it exists in non-volatile storage. Node 402 is the root node. Nodes 404, 406 and 408 represent child nodes of node 402. Nodes 404, 406 and 408 are first level nodes. Node 410 is a child node of node 404, nodes 412, 414 and 416 are child nodes of node 406 and node 418 is a child node of node 408. Nodes 410, 412, 414, 416 and 418 are second level nodes. Nodes 420 and 422 are child nodes of node 410 and nodes 424 and 426 are child nodes of node 418. Nodes 420, 422, 424 and 426 are third level nodes. Physical directory 400 may represent the global hierarchical file system directory for processes in the system environment 201 and may represent, for example, the following:

Node 402 may represent the C drive

Node 406 may represent the Documents and Settings folder or sub-directory.

Node 408 may represent the Program Files folder or sub-directory.

Node 410 may represent the WINDOWS folder or sub-directory.

Nodes 412, 414 and 416 may represent user folders or sub-directories, (e.g., node 412 may be user Madhu's folder, node 414 may be user Jeff's folder and node 416 may be user Erick's folder).

Virtual hierarchy 450 (enclosed in the dotted box) may represent a virtual file system directory that may be created in memory (i.e., volatile storage) for a silo such as silo 204 of FIG. 3, created at step 458. Virtual hierarchy 450 exists independently of physical hierarchy 400. Physical hierarchy 400 is unaffected by the creation, use, or operations on virtual hierarchy 450. An empty virtual root (e.g., node 430) is created (FIG. 4e, 460). Then virtual directory nodes are created (462). For example, in FIG. 4a, nodes 432, 434, 436 and 438 may be created. Nodes may be created on one or more sub-root levels. For example, nodes 432, 434 and 436 are first level nodes and node 428 is a second level node. Any number of levels of nodes may be created. Junctions may then be created to the physical hierarchy (i.e., to the physical file system directory in the example) on non-volatile storage (466). A junction may be created from a leaf node such as leaf node 432, leaf node 436 and/or leaf node 438 to a node in the underlying physical directory. For example, in virtual directory 450 a junction (junctions are indicated in the figures by dashed arrows) extending from leaf node 432 of virtual directory 450 to node 410 of physical directory 400 has been created, a junction from leaf node 436 of virtual directory 450 to node 408 of physical directory 400 has been created, and a junction from leaf node 438 of virtual directory 450 to node 416 of physical directory 400 has been created. It is not necessary to name nodes in the virtual directory the same as corresponding nodes in the physical directory. For example, the node named Erick in physical directory 400 may be named ErickX in virtual directory 450. FIG. 4b illustrates the effect of creation of the junctions.

FIG. 4c illustrates the resulting logical directory for silo 204. When a process in silo 204 accesses node 426 of the silo's virtual directory 450 (e.g., C:\Program Files), node 408 (e.g., the Program Files directory of the physical directory 400) will be accessed. Similarly, when a process in silo 204 accesses node 432 of the silo's virtual directory 450, node 410 (e.g., the WINDOWS directory of the physical directory 400) will be accessed. If a process in silo 204 accesses node 434 of the silo's virtual directory 450 and enumerates the list of child nodes of node 434, only node 438 will appear in the list. For example, suppose a process outside the silo requests an enumeration of the users in the Documents and Settings directory (C:\Documents and Settings\). The list of users will include child nodes 412, 414 and 416 (e.g., Madhu (node 412), Jeff (node 414) and Erick (node 416)). A process inside the silo that makes the same request will return a list including only Erick because node 438 is the only child node of node 434 of virtual directory 430, hence creating a "view" of the global name space. Node 438 of the virtual directory 450 points to node 416 of the physical directory 400. Furthermore, if a process in silo 204 attempts to access nodes 412 and 414 of physical directory 400, the process will be unable to do so because that name is not able to be resolved in the process' name space. For example, if a process in silo 204 attempted to open the file represented by node 412 (e.g., C:\Documents and Settings\Madhu\), it will be unable to because the name cannot be resolved in the virtual directory (the silo's file system name space).

It will be appreciated that a junction from any node of a virtual directory may be established to any node of a physical directory. Furthermore, it will be appreciated that any node in the physical directory that exists above the junction will be unavailable to any process using the virtual directory. For example, nodes 402, 404 and 406 are unavailable to a process whose virtual directory is virtual directory 450. Furthermore, it will be appreciated that additional levels of nodes may exist between the virtual root node and the leaf nodes in the virtual directory hierarchy, as shown in FIG. 4d, in which the nodes 440 and 442 exist on a first sub-root level between root node 430 and leaf nodes 432 and 436. Node 442 exists on a first sub-root level between root node 430 and leaf node 438 and node 434 exists on a second sub-root level between node 442 and leaf node 438. Although only three sub-root levels are shown in FIG. 4d, any number of sub-root levels may exist in a virtual directory hierarchy.

Each node in the virtual directory may include one or more of the following pieces of information:

a pointer to a physical directory node or a string representing the name of the physical directory node a linked list or other suitable data structure representing a set of children nodes for the node an access mask An access mask is a 32-bit value containing the permissions that are allowed or denied in the ACE (Access Control Entry), which is used in an ACL (Access Control List). When an object is opened, the Access Mask is used to request access rights.

A process, a group of processes, a program, a group of programs, an application or a group of applications may be placed in the isolated environment. Each process, etc. will access the virtual hierarchy associated with the isolated environment. Access to resources is thus restricted to those portions of the system hierarchy for which junctions to the physical hierarchy are provided. The virtual hierarchy provides the only way that a process within the isolated environment can access a resource or set of resources represented by the virtual hierarchy.

Figure 5:
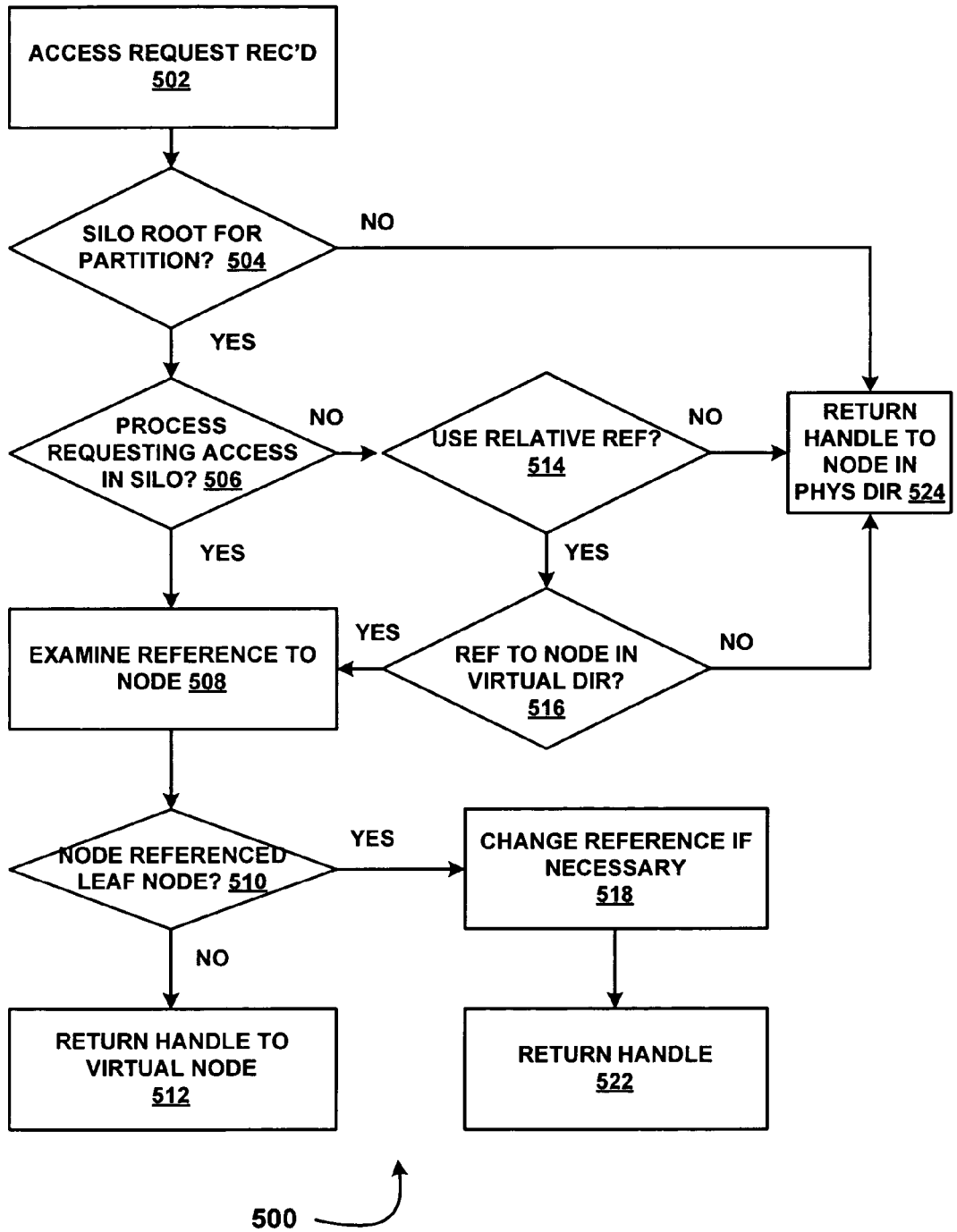
FIG. 5 is a flow diagram of a method of accessing a node in a virtual hierarchy in accordance with some embodiments of the invention.

FIG. 5 illustrates a process 500 for accessing a node in a virtual directory, in accordance with some embodiments of the invention. At 502, a request for access to a node in a directory is received. At 504, a check is made to determine if there is a silo directory for the partition referenced. If there is no silo directory for the partition, a handle is returned to a node in the appropriate physical directory in the appropriate partition at 524. If there is a silo directory for the partition, processing continues at 506. At 506, it is determined whether the process requesting access is in a silo or not in a silo. In some embodiments of the invention, whether or not the process requesting the access is in a silo and in which silo the process resides can be determined by the contents of a field in the process structure although any suitable method of determining this is contemplated by the invention. In some embodiments of the invention, the process structure is stored in kernel memory which is inaccessible to the process, making it impossible for the process to access or change the silo-identifying field. If the process requesting access to the node is not a silo process, the statement requesting access is examined to determine whether the statement uses a relative reference to the node or an explicit reference to the node (514). If an explicit reference is used, a handle is returned to a node in the appropriate physical directory on the appropriate partition at 524. If a relative reference to the node is used, the reference is resolved to determine if the node being accessed is a node in the virtual directory (516). If the node is a node in the virtual directory the reference to the node is examined at 508. If the node being accessed is not a node in the virtual directory, a handle is returned to a node in the physical directory at 524.

At 510, if the node referenced is a node in the virtual directory and the node referenced is not a leaf node, a handle is returned to the virtual node (512). If the node referenced is a leaf node, the name used to reference the node is changed to a name that can be resolved in the physical directory (518), and a handle to a node in the physical directory is returned (522). For example, suppose a request to open a file is received. Suppose that the specific request is "open C:\Documents and Settings\Erick"). At 504 it may be determined that a silo (e.g., silo 204) exists on partition C. If the process requesting access to the Erick folder is a process such as a process of system processes 250 (i.e., a process outside the silo), a handle to node 416 of FIG. 4*a* may be returned. If the process requesting access to the Erick folder is a process such as process 208*a* (i.e., a process within the silo), the node to which access is being requested is node 438 of virtual directory 450. Node 438 is a leaf node, with a junction to node 416 in the physical directory. Suppose node 438 of virtual directory is named ErickX. In this case, the name would have to be changed to Erick in order to be correctly resolved in the physical directory.

Figure 6:
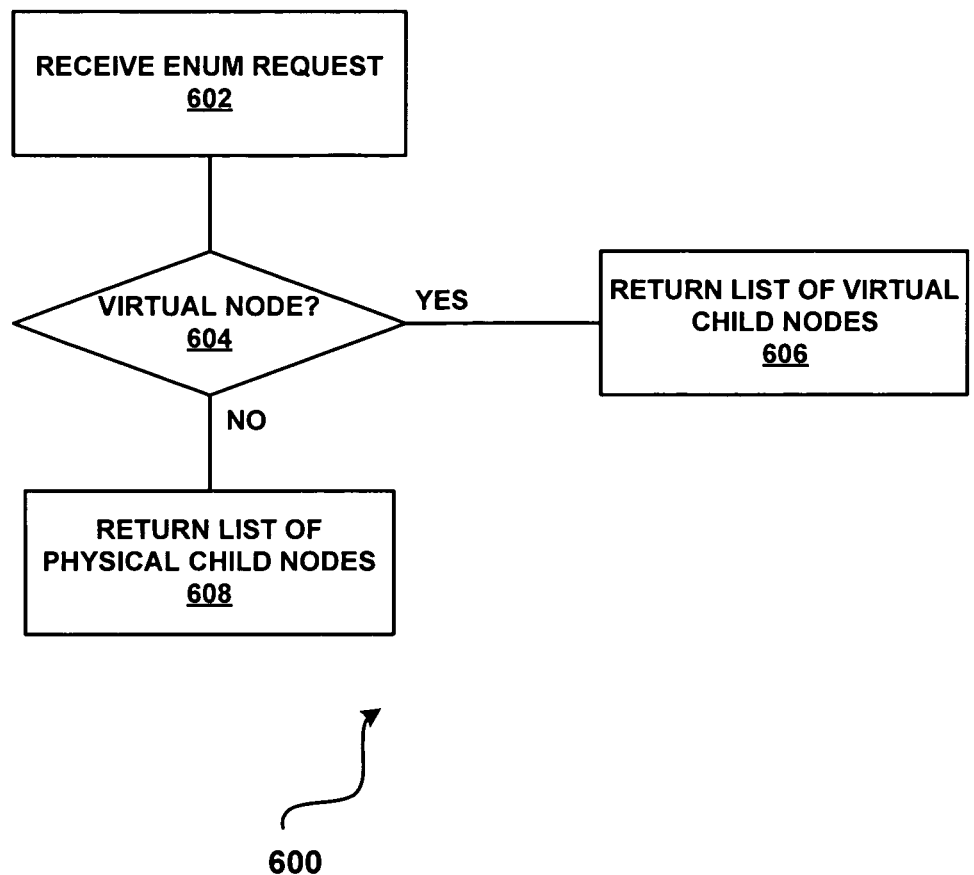
FIG. 6 is a flow diagram of a method of enumerating the nodes in a hierarchy in accordance with some embodiments of the invention.

FIG. 6 illustrates a process 600 for enumeration of the child nodes of a particular node in accordance with some embodiments of the invention. At 602 an enumeration request is received. At 604, it is determined if the node for which the enumeration of child nodes is being requested is a node in a virtual directory, as for example, would occur if a process in a silo originated the request. If the node for which the enumeration is requested is a node in a virtual directory, the list of child nodes for the node in the virtual directory is returned at 606. If not the list of child nodes for the physical directory is returned at 608. For example if the request: enumerate the child nodes of C:\Documents and Settings\ is received, it is determined whether the request refers to the physical directory or to the virtual directory. If the request refers to the virtual directory, (e.g., virtual directory 450, then the child nodes of node 434 are returned (node 438 which contains a pointer to node 416, e.g., Erick). If the request refers to the physical directory, (e.g., physical directory 400, the child nodes of node 406 are returned, e.g., Madhu, Jeff and Erick.

In this way, a process in a silo associated with a virtual directory can be constrained to see only a designated portion of the global name space.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for restricting access to resources comprising:
a computing device storing instructions that when executed cause:
an operating system module to instantiate a system environment, the system environment associated with a global physical hierarchy comprising a plurality of nodes representing resources and an isolated environment within the system environment associated with a view of the global physical hierarchy,
the view constraining access of an entity executing in the isolated environment to a subset of the resources and forms a virtual file system hierarchy that is different from a hierarchy in the global physical hierarchy and contains at least one node in addition to the nodes in the global hierarchy,
the virtual file system hierarchy comprising a first virtual node with a link to a first physical node in the global physical hierarchy, and a second virtual node with a link to a second physical node in the global physical hierarchy, a relative arrangement of the first and second virtual nodes within the virtual file system hierarchy differing as compared to a relative arrangement of the first and second physical nodes within the global physical hierarchy,
the operating system module adapted to generating the view by creation of the virtual file system hierarchy in volatile storage only, the virtual file system hierarchy not persisted to non-volatile storage and wherein the entity's sole access to the subset of the resources is via the virtual file system hierarchy, the operating system module adapted to receiving a first request to access a first node in the virtual file system hierarchy, and, in response to determining that the first node is not a leaf node, responding to the first request by returning a file handle that references the first node, the operating system module adapted to receiving a second request to access a second node in the virtual file system hierarchy, in response to determining that the second node is a leaf node, determining a name used to reference a node in the physical directory; and responding to the second request by returning a file handle that references the name used to reference the node in the physical directory.

2. The system of claim 1, wherein the global physical hierarchy represents a global file system directory and wherein the virtual file system hierarchy represents a subset of the global file system directory for the isolated environment, each node in the global file system directory representing a sub-directory or a file.

3. The system of claim 1, wherein the entity comprises a process, group of processes, program, group of programs, application or group of applications.

4. The system of claim 1, wherein the virtual file system hierarchy comprises a plurality of virtual nodes wherein at least one virtual node of the plurality of virtual nodes comprises a link to a physical node of the global physical hierarchy.

5. The system of claim 1, wherein the isolated environment comprises at least one process executing in the isolated environment and wherein the virtual file system hierarchy is a default hierarchy for the at least one process.

6. The system of claim 1, wherein the isolated environment is a silo.

7. The system of claim 1, wherein the isolated environment is a first isolated environment of a plurality of side-by-side isolated environments within the system environment.

8. The system of claim 1, wherein the isolated environment includes at least one level of nested isolated environments.

9. The system of claim 5, wherein the virtual file system hierarchy restricts a set of resources available to the at least one process by restricting to a subset of the global physical hierarchy the view of the global physical hierarchy presented to the at least one process.

10. A method of providing a view of a global name space to an entity executing in an isolated environment comprising:

generating the isolated environment within a system environment via an operating system image, the operating system image serving the isolated environment and the system environment, the system environment associated with a global physical hierarchy on non-volatile storage and the isolated environment associated with a view of the global physical hierarchy;

generating the view by creating a virtual file system hierarchy that is different from a file system hierarchy in the global physical hierarchy and contains at least one node in addition to the nodes in the global file system hierarchy, and that provides the entity access to only a subset of the global physical file system hierarchy, the virtual file system hierarchy stored only in volatile storage;

receiving a first request to access a first node in the virtual file system hierarchy;

in response to determining that the first node is not a leaf node, responding to the first request by returning a file handle that references the first node;

receiving a second request to access a second node in the virtual file system hierarchy;

in response to determining that the second node is a leaf node, determining a name used to reference a node in the physical directory; and responding to the second request by returning a file handle that references the name used to reference the node in the physical directory.

11. The method of claim 10, further comprising generating the virtual hierarchy by creating a virtual root node for the virtual hierarchy;

creating at least one level of nodes depending from the virtual root, wherein at least one node of at least one of the levels of nodes comprises a leaf node;

creating a link from the at least one leaf node to a node in the global physical directory.

12. The method of claim 10, wherein the isolated environment is a silo.

13. The method of claim 10, further comprising nesting a child isolated environment within the isolated environment.

14. The method of claim 10, wherein the global physical hierarchy is a file system directory for the system environment and the virtual hierarchy is a virtual file system directory for the entity executing in the isolated environment.

15. The method of claim 10, wherein the isolated environment is a first isolated environment of a plurality of side-by-side isolated environments.

16. The method of claim 10, wherein the entity comprises a process, a group of processes, an application or a group of applications.

17. A computer-readable storage device comprising computer-executable instructions for:

restricting a set of resources available to a process, group of processes, application or group of applications running in a silo by creating a virtual file system hierarchy accessed by the process, the group of processes, the application or the group of applications, the virtual file system hierarchy comprising a first and a second virtual node, the first virtual node comprising a link to a first physical node of a physical file system hierarchy, the second virtual node comprising a link to a second physical node of the physical file system hierarchy, the virtual file system hierarchy containing at least one node in addition to the nodes in the global hierarchy, a relative arrangement of the first and second virtual nodes within the virtual file system hierarchy differing as compared to a relative arrangement of the first and second physical nodes within the global physical file system hierarchy, the virtual file system hierarchy providing sole access to a node in the physical file system hierarchy via a link from a node in the virtual file system hierarchy to the node in the physical file system hierarchy;

receiving a first request to access a first node in the virtual file system hierarchy;

in response to determining that the first node is not a leaf node, responding to the first request by returning a file handle that references the first node;

receiving a second request to access a second node in the virtual file system hierarchy;

in response to determining that the second node is a leaf node, determining a name used to reference a node in the physical directory; and responding to the second request by returning a file handle that references the name used to reference the node in the physical directory.

18. The computer-readable device of claim 17, comprising further computer-readable instructions for:
- storing the virtual hierarchy only in volatile storage and not in non-volatile storage.

19. The computer-readable device of claim 17, wherein the computer-executable instructions comprise a portion of an operating system that serves the silo and a plurality of system processes external to the silo.

20. The computer-readable device of claim 17, wherein the computer-executable instructions comprise a portion of a silo file system.

\* \* \* \* \*